(12) United States Patent
Endres et al.

(10) Patent No.: US 7,658,810 B2
(45) Date of Patent: Feb. 9, 2010

(54) METHOD FOR SEALING EDGES OF A CORE OF A COMPOSITE SANDWICH STRUCTURE

(75) Inventors: Gregor Christian Endres, Bayreuth (DE); Hans-Juergen Weber, Verden (DE)

(73) Assignee: Airbus Deutschland GmbH, Hamburg (DE)

(*) Notice: Subject to any disclaimer, the term of this patent is extended or adjusted under 35 U.S.C. 154(b) by 786 days.

(21) Appl. No.: 11/083,390

(22) Filed: Mar. 17, 2005

(65) Prior Publication Data

US 2005/0204693 A1 Sep. 22, 2005

Related U.S. Application Data

(60) Provisional application No. 60/600,067, filed on Aug. 9, 2004.

(30) Foreign Application Priority Data

Mar. 17, 2004 (DE) .................. 10 2004 013 145

(51) Int. Cl.
*B31F 1/20* (2006.01)
(52) U.S. Cl. .................. 156/210; 156/212; 156/219; 156/220; 156/227; 428/181; 428/182; 428/183; 428/184; 428/185
(58) Field of Classification Search .................. 156/206, 156/220, 219, 227, 197, 210, 212; 428/181–185, 428/74, 75; 210/321.64, 321.72, 321.74, 210/321.77, 321.78, 321.86
See application file for complete search history.

(56) References Cited

U.S. PATENT DOCUMENTS

| 2,569,826 | A | 10/1951 | Packard |
| 2,576,530 | A | 11/1951 | Medal |
| 2,963,128 | A | 12/1960 | Rapp |
| 3,305,996 | A | 2/1967 | Shapiro |
| 3,449,157 | A | * 6/1969 | Kurt .................. 156/204 |
| 3,886,023 | A | 5/1975 | Deplante |
| 3,887,990 | A | 6/1975 | Wilson |
| 4,001,474 | A | 1/1977 | Hereth |
| 4,034,135 | A | 7/1977 | Passmore |
| 4,265,688 | A | 5/1981 | Gorski |
| 4,410,427 | A | * 10/1983 | Wydeven .................. 210/317 |
| 4,812,193 | A | 3/1989 | Gauron |

(Continued)

FOREIGN PATENT DOCUMENTS

DE 2 316 061 10/1973

(Continued)

*Primary Examiner*—Richard Crispino
*Assistant Examiner*—Christopher Schatz
(74) *Attorney, Agent, or Firm*—W. F. Fasse; W. G. Fasse

(57) ABSTRACT

A composite sandwich structure is produced by providing a core structure, applying cover layers on opposite sides of the core structure, and forming an edge seal. The core structure has a folded cell structure with fold valleys forming continuous open channels with open ends and/or open channel sides at edges of the core structure. The channels extend along and are bounded between the fold valleys and the cover layers. The edge seal is formed to have a limited spatial volume in an edge region at an edge of the core structure, to close and seal open ends and/or open channel sides of the channels of the core, without an uncontrolled penetration of the seal material from the edge region to a greater depth into the open channels.

8 Claims, 3 Drawing Sheets

U.S. PATENT DOCUMENTS

| | | | |
|---|---|---|---|
| 5,316,828 A | | 5/1994 | Miller |
| 5,378,099 A | | 1/1995 | Gauron |
| 5,443,779 A | * | 8/1995 | Ichikawa .................... 264/286 |
| 5,750,235 A | | 5/1998 | Yoshimasa |
| 5,993,580 A | * | 11/1999 | Nakayama et al. ......... 156/62.6 |
| 6,187,123 B1 | | 2/2001 | Chenier et al. |
| 6,193,830 B1 | * | 2/2001 | Unrath ....................... 156/226 |
| 6,245,407 B1 | | 6/2001 | Wang et al. |
| 6,290,068 B1 | * | 9/2001 | Adams et al. ............... 209/401 |
| 6,713,008 B1 | | 3/2004 | Teeter |
| 6,837,018 B1 | | 1/2005 | Hagel et al. |
| 2003/0087049 A1 | | 5/2003 | Hachenberg et al. |
| 2005/0206035 A1 | | 9/2005 | Endres et al. |
| 2005/0208273 A1 | | 9/2005 | Endres et al. |
| 2005/0208274 A1 | | 9/2005 | Endres et al. |

FOREIGN PATENT DOCUMENTS

| | | |
|---|---|---|
| DE | 89 15 724 | 5/1991 |
| DE | 43 21 316 | 1/1995 |
| DE | 297 12 684 | 11/1998 |
| DE | 101 46 201 | 4/2003 |
| DE | 101 54 063 | 5/2003 |
| EP | 0 264 870 | 4/1988 |
| EP | 0 589 054 | 3/1994 |
| JP | 63-44449 | 12/1994 |
| JP | 06344449 | 12/1994 |

* cited by examiner

METHOD FOR SEALING EDGES OF A CORE OF A COMPOSITE SANDWICH STRUCTURE

CROSS-REFERENCE TO RELATED APPLICATION

This U.S. Non-Provisional Application claims the benefit under 35 U.S.C. §119(e) of U.S. Provisional Application 60/600,067, filed on Aug. 9, 2004, the entire disclosure of which is incorporated herein by reference.

PRIORITY CLAIM

This application is based on and claims the priority under 35 U.S.C. §119 of German Patent Application 10 2004 013 145.7, filed on Mar. 17, 2004, the entire disclosure of which is incorporated herein by reference.

FIELD OF THE INVENTION

The invention relates to a method for the edge sealing of a core composite, i.e. a composite sandwich structure having a lightweight core between cover layers, wherein the core has an open three-dimensional structure, especially a folded or pleated comb or cell structure.

BACKGROUND INFORMATION

Due to their extraordinarily good ratio of stiffness or strength to density, core composites have a broad range of application especially in the field of aircraft construction.

Well-known conventional core composites are generally formed of an upper and a lower cover layer or cover ply, between which is located, for example, a honeycomb-type core structure formed of vertically extending cells with a hexagonal cross section, for increasing the stiffness of the resulting composite sandwich structure.

For example metallic corrosion-protected aluminum foils, or non-metallic materials, such as Nomex®- or Kevlar®/N636-paper for example, are used for forming the core structure. Both the Nomex®-paper as well as the Kevlar®/N636-paper are coated with phenolic resin in a submersion process for increasing the mechanical strength thereof.

The provision of edge seals in such core structures, as represented by the above described true honeycomb structures, is not problematic. Due to the small-volume repeat units represented by the individual hexagonal cells extending perpendicularly between the cover layers, seal material for the formation of the edge seal can be troweled, painted, filled, pressed, foamed or poured locally into edge regions of the core structure. Thereby the seal material is confined in the cells directly in this edge region, and cannot flow or spread uncontrollably into the remaining interior of the core structure away from the edge region. The material forming the edge seal can, for example, be a curable synthetic plastic material, for example in the form of a synthetic resin and/or synthetic plastic foam.

In contrast to the above described core composites having true honeycomb cell configurations, in which a spatial limitation or bounding of the cells is always present, new types of core composites, especially formed of three-dimensional folded or pleated comb structures, comprise an open or drainable structure. Namely, such pleated or folded core structures include fold or pleat valleys that form open channels extending continuously in the plane of the composite structure, i.e. along or parallel to the cover layers from edge-to-edge of the composite structure. Thus, the core channels of such a core composite remain drainable or ventilatable through the edges even after the opposite major surfaces of the core structure have been covered with the cover layers. Thereby, for example, it is possible to guide various types of lines (e.g. electrical lines, hydraulic lines, water lines, air lines, etc.) through the core composite without previously having to cut or machine a passage therethrough while impairing the mechanical properties of the core composite.

If, for the formation of an edge seal of the above described drainable core structures, a pasty or viscous curable seal material is introduced into edge regions of the core structure, then this material can spread out, depending on the viscosity, more or less uncontrolledly throughout the open channels of the open core structure. In other words, the seal material would not remain confined to the edge region, but rather could flow or run from the edge region freely deeper toward the center of the core structure along the open fold valley channels. Thus, viscous or pasty substances can spread out uncontrollably over larger distances when using open drainable core structures. In contrast, in true honeycomb structures, basically only a limited number of structural units (e.g. hexagonal cells) are opened by a separating cut at the edge of the structure, so that any seal substances introduced into the open cells in the edge region are always spatially limited to those cells. Thus the standard edge-sealing methods according to the state of the art are not usable for providing spatially limited edge seals in open drainable core structures.

SUMMARY OF THE INVENTION

It is an object of the invention to provide a method for edge sealing core composites with open core structures, especially with three-dimensional folded comb structures, in which merely a small defined volume of the sealant material is introduced into and spatially limited to the edge regions of the core composite. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in a method of producing a composite sandwich structure. The method involves providing a core structure having a folded cell structure with fold valleys, and applying first and second cover layers respectively on opposite first and second sides of the core structure. This forms continuous channels along the fold valleys of the core structure, namely bounded between the surfaces of the fold valleys and the first and second cover layers. The channels have open ends and/or open channel sides at edges of the core structure. The method further involves closing and sealing at least some of the open ends and/or some of the open channel sides of the channels by forming at least one edge seal having a limited spatial volume in at least one edge region on at least one of the edges of the core structure.

According to the invention, since at least one edge seal with a limited spatial volume is formed in at least one edge region of the core structure, thereby only a defined volume of the sealant material gets into the edge region of the core composite or the core structure.

By the method according to the invention, the sealing of edge regions of core composites with open core structures is achieved in an especially simple manner. It is especially advantageous, that only a limited and defined volume of the sealant material is introduced into the edge region of the core composite or especially the core structure thereof in carrying out the method according to the invention, so that only a small weight increase of the core composite results, similar to that arising when core composites with true honeycomb-type core structures are edge-sealed.

Further developments and advantageous embodiments of the invention are set forth in the following patent claims. Also, further advantages arise from the following detailed description of the invention.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF PREFERRED EXAMPLE EMBODIMENTS AND OF THE BEST MODE OF THE INVENTION

Figure 1:
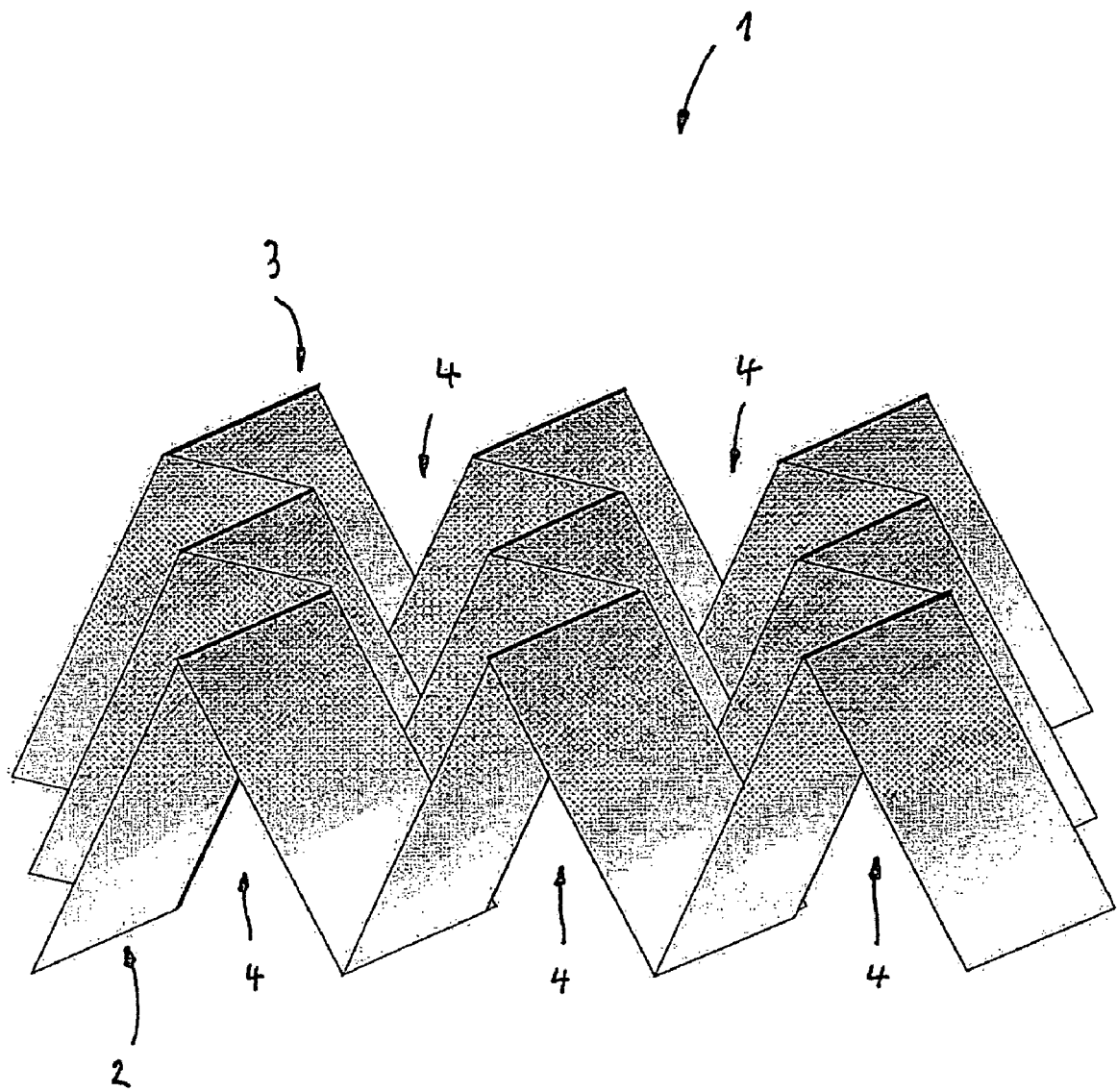
FIG. 1 is a perspective view of an open core structure of a core composite, whereby the core structure is embodied as a folded comb or pleated cell structure.

FIG. 1 shows an example of an open three-dimensional core structure 1 for the formation of a core composite. The core structure 1 in this regard is formed of three-dimensional folded or pleated combs or cells forming fold valleys that in turn form open channels extending along the fold valleys. Through-going channels 4 are recognizable on a bottom side or surface 2 and a top side or surface 3 of the core structure 1. The channels may be straight linear channels, or may have a zig-zag configuration as shown, or some other non-linear multi-axial compound folded configuration. The channels 4 may, for example, be used for guiding electrical or hydraulic lines through the core structure 1. In this regard, due to the openness of the core structure, no bored holes or openings, which could impair the characteristics of the core structure, are necessary.

The core structure 1 may, for example, be formed of metallic and corrosion-protected aluminum foils. Alternatively, for example, Nomex®- or Kevlar®/N636-paper, which is coated with phenolic resin in a submersion process for example, can be used to form the core structure 1.

Figure 2:
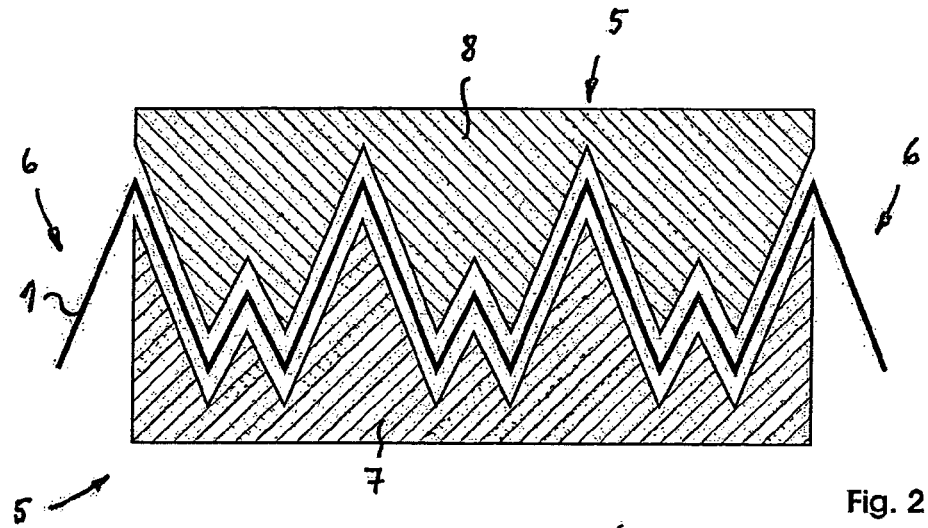
FIG. 2 is a side sectional view of a first stage of processing according to a first variant of the inventive method.
Figure 3:
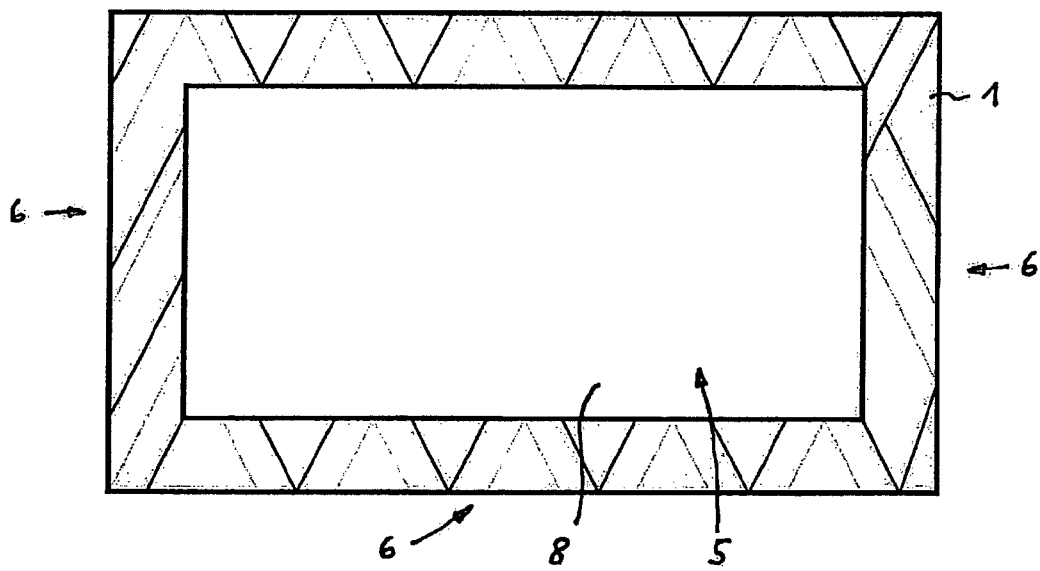
FIG. 3 is a top plan view of the stage according to FIG. 2.
Figure 4:
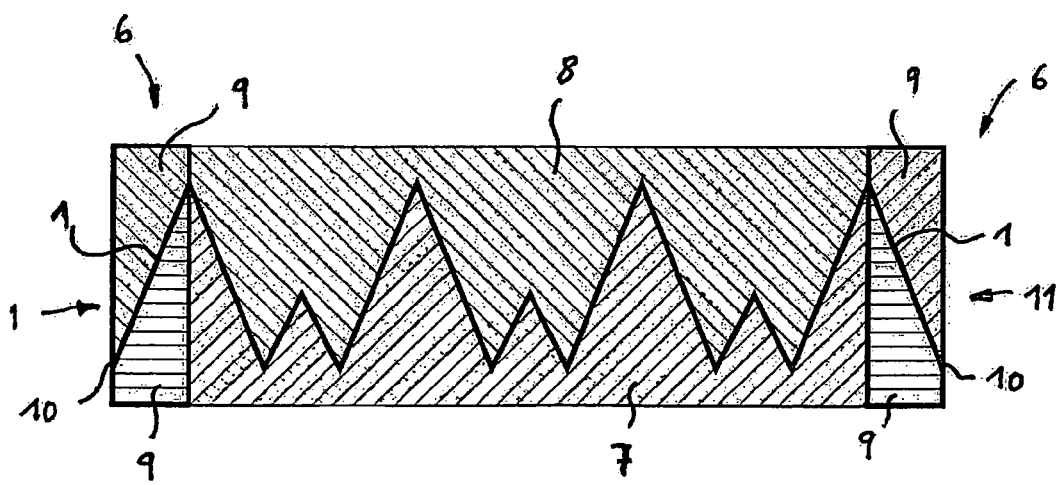
FIG. 4 is a side sectional view of a further second stage of processing according to the first variant of the inventive method, subsequent to FIGS. 1 and 2.

FIGS. 2 to 4 schematically show the course or progression of the method according to the invention according to a first variant.

FIG. 2 shows the core structure 1 with a cover 5 lying nearly fully surfacially thereon, in a cross sectional view. In a first method step, the cover 5 is applied onto the core structure 1 as a spatial bounding or limiting means to limit or confine the application of an edge seal material in a subsequent step (as will be explained below). In this regard, edge regions 6 of the core structure 1 are left free, i.e. as a rim or flange of the core structure protruding outwardly and exposed from the cover 5. In the illustrated example embodiment, the cover 5 for limiting the seal material introduction is produced with a bottom core impression 7 of the bottom side 2 of the core structure 1 as well as a top core impression 8 of the top side 3 of the core structure 1. The core impressions 7, 8, for this purpose, are embodied form-fitting to the surface structure of the core structure 1.

The core impressions 7, 8 can, for example, be formed of a synthetic plastic material. In the practical application, especially silicone elastomers, which have good anti-adhesion characteristics, have been proven to be advantageous. Basically, however, all synthetic plastic materials, for example polyethylene (PE), polypropylene (PP), polytetrafluoroethylene (PTFE), as well as metals of all types can find application. In an especially advantageous manner, for example, the molding or casting material Aircast3700® is used to form the core impressions 7, 8 as impressions or molds of the surfaces of the relevant portions of the bottom side 2 and the top side 3 of the core structure 1.

FIG. 3 shows the core structure 1 after completion of the first method step, in a top plan view. The top core impression 8 forming the cover 5 in this regard lies preferably fully surfacially on the center area of the top surface 3 of the core structure 1 while leaving free the edge regions 6. The core impression 7, which is not visible in the top view of FIG. 3, similarly lies in contact on the center area of the opposite bottom side 2 of the core structure 1. For large-surface core structures 1, the top and/or the bottom core impression 7, 8 can, for example, alternatively cover only a certain limited area or areas of the core structure 1, e.g. forming a perimeter ring inwardly bounding the exposed edge region 6 while also leaving a center area of the core structure uncovered.

Then, in a second method step, a sealant compound, mass or material 9 is introduced preferably beginning from outer edges 10 of the core structure 1 and extending inwardly along the edge region 6 to the bottom and top core impression 7, 8 for the formation of an edge seal 11 (see FIG. 4 showing a cross-sectional view of the core structure 1 with laid-on core impressions 7, 8 and the introduced sealant material 9 in the second method step). For example a synthetic plastic material, especially a curable synthetic resin and/or a curable synthetic plastic foam, can be used as the sealant material 9. While not shown in FIG. 3, the introduction the of sealant material 9 can be carried out by injecting the sealant material into a mold around the edge region, by casting or molding the sealant material around the edge region, by dipping the edge region into a trough filled with the sealant material, by simply extruding or troweling or spreading the sealant material along the exposed edge region, or the like, e.g. depending on the viscosity of the sealant material. Basically, any conventionally known or future developed sealant introduction processes suitable in this regard can be used.

The type, quality or nature of the sealant material 9 should especially be selected to have good adhesion or bonding characteristics with respect to both the core structure 1 as well as the cover layers that are to be applied in a subsequent step. Moreover, the sealant material 9 shall not have a very low viscosity, so that it does not run uncontrolledly out of the edge regions 6 after the introduction. Therefore, in practice, highly viscous or even pasty seal materials 9 have proven to be advantageous. Such very viscous or pasty materials can be troweled, extruded or spread along the edge region without needing any external confining mold or the like, while less viscous materials can be injected into a mold along the edge region as discussed above. Such a mold can be similar to the profile member 15 used according to another variant of the inventive method as discussed below in connection with FIG. 5. Thus, it should be understood that the features of the several variants of the inventive method are not mutually exclusive and necessarily independent, but rather can also be combined with one another. In other words, for example, the method of FIGS. 2 to 4 can further use the teachings of FIG. 5 and/or FIG. 6 in combination.

In further method steps not shown in FIGS. 2 to 4, for example after the sealant material 9 has partially or completely cured to form the edge seal 11, the core impressions 7, 8 are lifted off of the core structure 1 while leaving behind the edge seal 11 remaining along the edges of the core structure 1. Then, if necessary, the edge seal 11 is cut, milled, machined or otherwise mechanically processed to match its height to the height of the core structure 1. Thereafter, the core structure 1 is provided on both sides with cover layers for the formation of a core composite.

Figure 5:
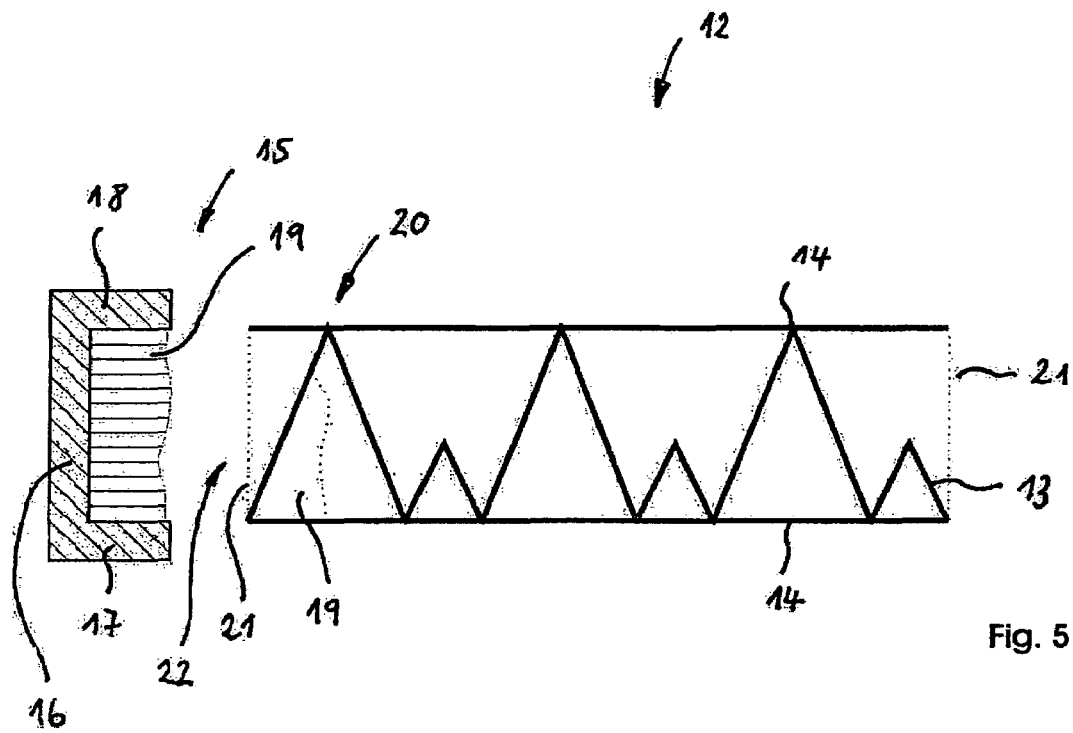
FIG. 5 is a side sectional view of a stage during the processing according to a second variant of the inventive method.
Figure 6:
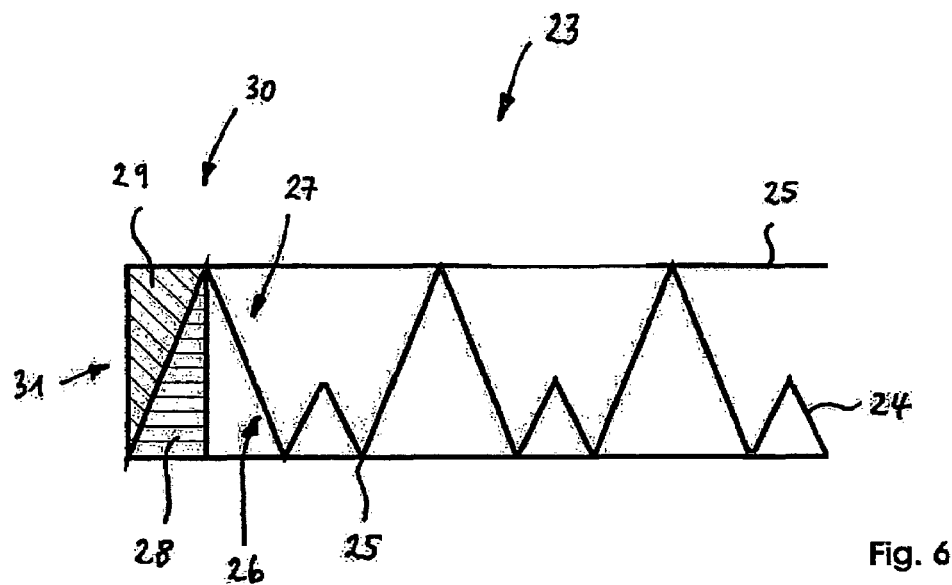
FIG. 6 is a side sectional view of a composite sandwich structure resulting from a third variant of the inventive method.

FIG. 5 shows a cross-sectional view of a core composite 12 with cover layers 14 already applied on a core structure 13, in which an edge seal 22 is formed by means of a second variant of the method according to the invention. For this purpose, a profile or sectional member 15 with a, for example, U-shaped cross-sectional geometry is used. The profile 15 comprises two shanks 17, 18 protruding perpendicularly from and connected together by a rear or back wall 16. The profile 15 is filled with a defined volume of a sealant material 19 and is then pushed as far as possible onto an edge region 20 of the core composite 12. Instead of measuring out a defined volume of the sealant material 19, the profile 15 can also be completely filled with the sealant material 19, whereby similarly a defined volume introduction results. In the ideal case, the inner surface of the rear or back wall of the profile 15 contacts nearly completely on the outer edge 21 of the core composite 12. In this regard, the sealant material 19 penetrates into the edge region 20 of the core composite 12 while forming an edge seal 22. The sealant material 19 can again be a synthetic plastic material, especially a curable synthetic resin and/or curable synthetic plastic foam. Pasty sealant materials 19 have been proved to be especially advantageous in this variant of the method, in order to avoid an uncontrolled penetration of the sealant material 19 into the core structure 13, especially by flowing or running away into the open channels of the core structure. Also, the edge 21 being sealed can be oriented downwardly so that gravity keeps the sealant material 19 confined to the edge region 20 during at least the partial curing or hardening of the sealant material.

The spacing distance between the shanks 17, 18 of the profile member 15 should approximately correspond to the height or thickness of the core composite 12 including the cover layers 14. Thereby it is achieved, that as small an amount as possible of the sealant material 19 is pressed out to the sides during the sliding-on of the profile 15 onto the core composite 12. The profile 15 can comprise a cross-sectional geometry deviating from the illustration of FIG. 5. For example, the profile 15 can comprise additional stiffening ribs or the like for increasing the mechanical strength. For the formation of edge seals on core composites 12 with curved outside edge contours, it is alternatively possible to flexibly embody the profile 15.

After the sealant material has sufficiently, partially or completely, cured or hardened to form the edge seal 22, then the profile member 15 may be removed, for example by being pulled off. Alternatively, if desired, the shanks 17 and 18 can be machined off to the thickness of the composite panel defined by the cover layers 14, while leaving the back wall 16 in place. As a further alternative, the entire profile member 15 may be left in place as a part of the finished composite panel.

Especially metals and/or synthetic plastic materials come into consideration as the material for the profile 15, whereby these should have good anti-adhesion characteristics if the profile 15 is to be removed as discussed above. The profile 15 can, for example, be produced of a silicone elastomer, because this material initially has good anti-adhesion characteristics, so that a separate anti-adhesion coating can be omitted as superfluous. On the other hand, a metallic material must, if applicable, additionally be provided with an anti-adhesion coating, separating lacquer and/or release film.

FIG. 6 shows again a core composite 23 with a core structure 24 and applied cover layers 25 in a schematic cross-sectional view, in which an edge seal 31 is formed according to a third variant of the inventive method. The core structure 24 again comprises a bottom side or surface 26 and a top side or surface 27.

For forming the edge seal 31, top and bottom formed bodies 28, 29 are produced or provided. The formed bodies 28, 29 are produced of a synthetic plastic material, especially a curable synthetic resin and/or a curable synthetic plastic foam. It is of decisive importance for the seal effectiveness of the produced edge seal 31, that the material for the formation of the formed bodies 28, 29 adheres well onto both the core structure 24 as well as the cover layers 25.

The bottom formed body 28 is embodied form-fitting with the bottom side or surface 26 of the core structure 24 in the edge region 30 and lies tightly in contact thereon. The top formed body 29 is similarly form-fitting with the top side or surface 27 of the core structure 24 in the edge region 30. For producing the formed bodies 28, 29, known impression or transfer or copy-molding methods can come into use, i.e. the formed bodies 28, 29 can be formed in place directly on the edge region 30 of the core structure 24 by casting or molding the abovementioned material.

Alternatively, the formed bodies 28, 29 can be pre-formed bodies that have been previously molded to match the shape of the edge region 30 of the core structure 24. In this regard, for forming the edge seal 31, the pre-formed bottom formed body 28 as well as the pre-formed top formed body 29, in the region of the bottom side or surface 26 or the top side or surface 27 respectively, are pushed into the core structure 24, and are connected therewith in a force-transmitting or frictionally-engaging manner in the edge region 30. This connection between the formed bodies 28, 29 and the core structure 24 can, for example, be achieved through gluing, welding, brazing, soldering, potting, casting, or foaming the respective pre-formed bodies into place in the edge region of the core structure.

In this method variant, under certain circumstances, an adaptation or matching of the height of the edge seal 31 to the height of the core structure 24 is no longer necessary.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method of producing a composite sandwich structure, comprising the steps:
   a) providing a core structure having a folded cell structure with fold valleys that form continuous open channels with open channel ends and/or open channel sides at edges of said core structure, and having opposite first and second major surfaces on opposite first and second sides thereof;
   b) closing and sealing said open channel ends and said open channel sides of said channels by forming respective edge seals having a limited spatial volume in respective edge regions on said edges of said core structure, by disposing first and second temporary covers on said first and second sides of said core structure so that said temporary covers leave said edge regions of said core structure open and exposed while covering at least a portion of said core structure situated inwardly displaced from said edges along said edge regions, and introducing a sealant material into said edge regions whereby said temporary covers limit said sealant material to said limited spatial volume and prevent said sealant material from penetrating beyond said limited spatial volume farther into said open channels, and wherein said sealant material forms said edge seals in said limited spatial volume, and then removing said temporary covers from said core structure after forming said edge seals, wherein said edge seals extend only a limited distance into said open channel ends and said open channel sides of said channels corresponding to said limited spatial volume thereby filling, closing and sealing said open channel ends and said open channel sides while leaving a remaining majority of a length of said channels hollow and devoid of said edge seals; and c) after said step b), applying first and second cover layers respectively on said first and second sides of said core structure having said edge seals formed thereon, thereby bounding said channels between said fold valleys and said first and second cover layers on said first and second sides.

2. The method according to claim 1, wherein said fold valleys extend along non-linear patterns as viewed from one of said major surfaces.

3. The method according to claim 1, wherein said folded cell structure includes folds in plural directions that are not all parallel to each other as viewed from one of said major surfaces.

4. The method according to claim 1, wherein said channels respectively extend longitudinally along one of said cover layers.

5. The method according to claim 1, wherein said first arid second temporary covers include a first core impression of a first partial area of said first major surface and a second core impression of a second partial area of said second major surface respectively formed in place on said first and second major surfaces to be form-fitting thereon.

6. The method according to claim 5, wherein said sealant material comprises a curable synthetic resin or a curable synthetic polymer foam.

7. The method according to claim 1, wherein said sealant material comprises a highly viscous, non-flowing, pasty sealant.

8. The method according to claim 1, wherein said sealant material comprises a curable synthetic resin or a curable synthetic polymer foam.

* * * * *

UNITED STATES PATENT AND TRADEMARK OFFICE
CERTIFICATE OF CORRECTION

PATENT NO. : 7,658,810 B2  Page 1 of 1
APPLICATION NO. : 11/083390
DATED : February 9, 2010
INVENTOR(S) : Endres et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1364 days.

Signed and Sealed this

Thirtieth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,658,810 B2 | Page 1 of 1 |
| APPLICATION NO. | : 11/083390 | |
| DATED | : February 9, 2010 | |
| INVENTOR(S) | : Endres et al. | |

It is certified that error appears in the above-identified patent and that said Letters Patent is hereby corrected as shown below:

<u>Title page,</u>
Item [56], References Cited, right column, Line 3, replace "Kurt" by --Wandel--;

<u>Column 2,</u>
Line 25, after "cells.", insert a new paragraph;

<u>Column 8,</u>
Line 11, after "first", replace "arid" by --and--.

Signed and Sealed this
Twelfth Day of July, 2011

David J. Kappos
*Director of the United States Patent and Trademark Office*